E. G. K. ANDERSON.
LAMP SOCKET.
APPLICATION FILED MAY 12, 1909.

1,025,230.

Patented May 7, 1912.

3 SHEETS—SHEET 1.

Witnesses:
Robert H. Weir
M. L. Farrar

Inventor:
Ernst G. K. Anderson
By Jones, Addington & Ames
Attys.

E. G. K. ANDERSON.
LAMP SOCKET.
APPLICATION FILED MAY 12, 1909.
1,025,230.
Patented May 7, 1912.
3 SHEETS—SHEET 2.
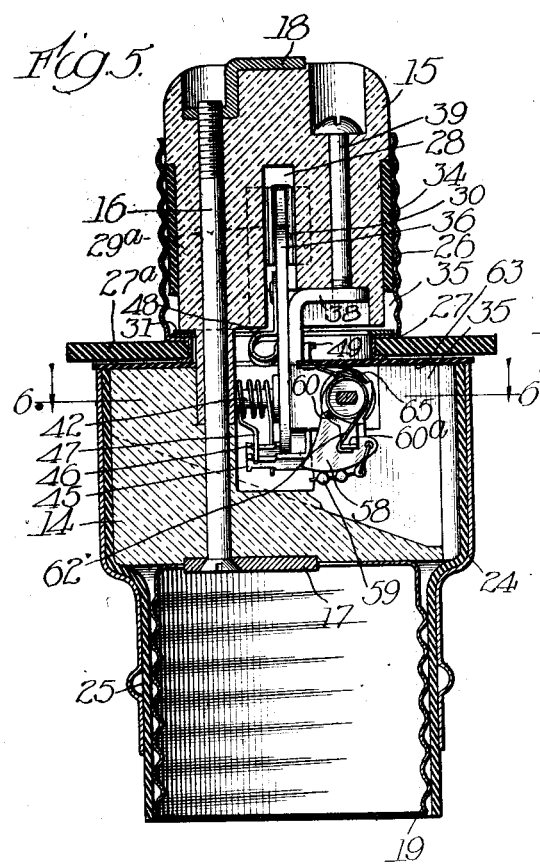
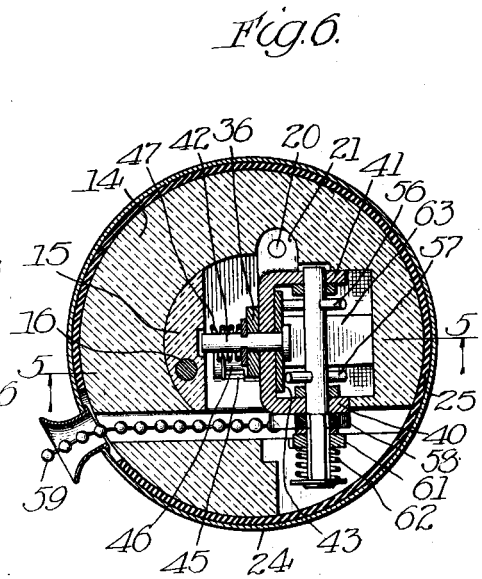
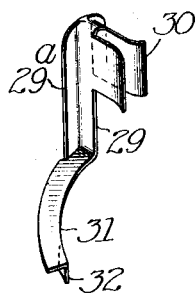
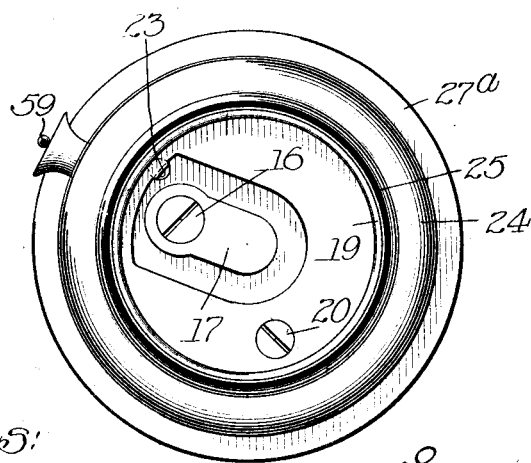

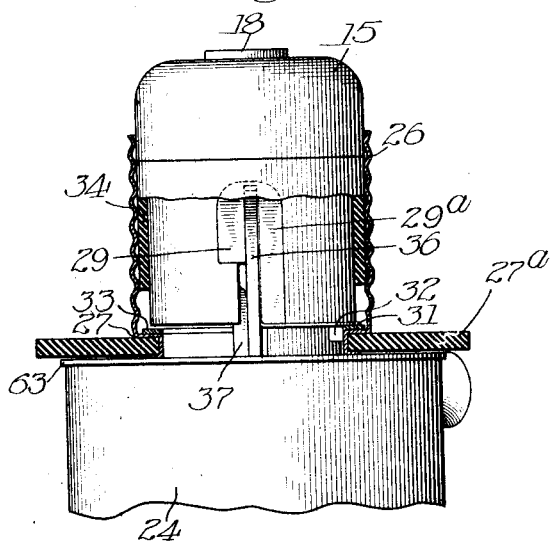
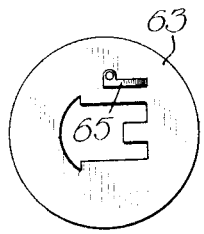
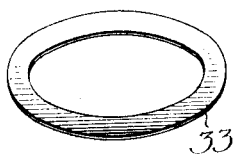
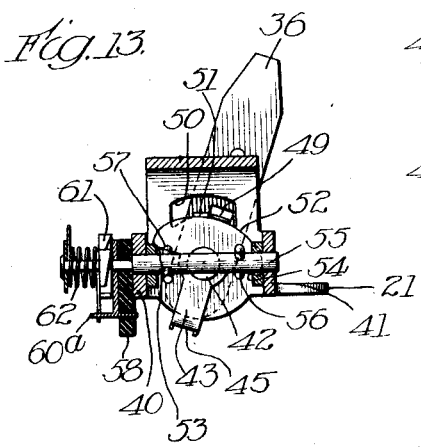
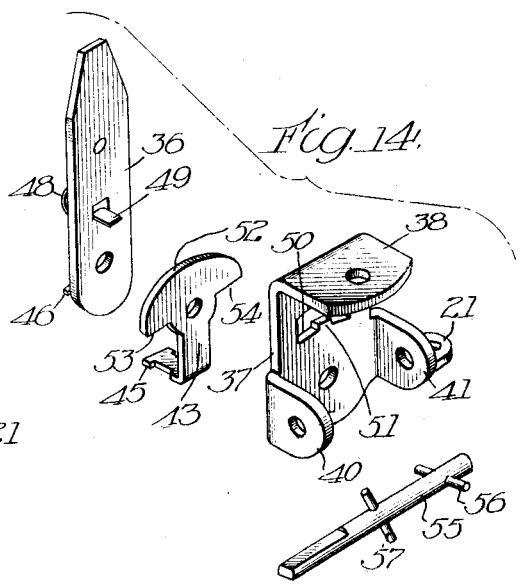

UNITED STATES PATENT OFFICE.

ERNST G. K. ANDERSON, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

LAMP-SOCKET.

1,025,230.　　　　Specification of Letters Patent.　　Patented May 7, 1912.

Application filed May 12, 1909. Serial No. 495,402.

*To all whom it may concern:*

Be it known that I, ERNST G. K. ANDERSON, a citizen of the United States, residing at Chicago, in the county of Cook and State of Illinois, have invented new and useful Improvements in Lamp-Sockets, of which the following is a full, clear, concise, and exact description, reference being had to the accompanying drawing, forming a part of this specification.

My invention relates to improvements in lamp sockets.

One of the objects of my invention is to provide a lamp receptacle having means for controlling the circuit through the lamp and means for connecting the same to an ordinary lamp socket, whereby a lamp socket is provided which may be plugged into the ordinary commercial lamp socket and is provided with a pull switch.

For the purpose of disclosing my invention, I have illustrated one form thereof in the accompanying drawings, in which—

Figure 1:
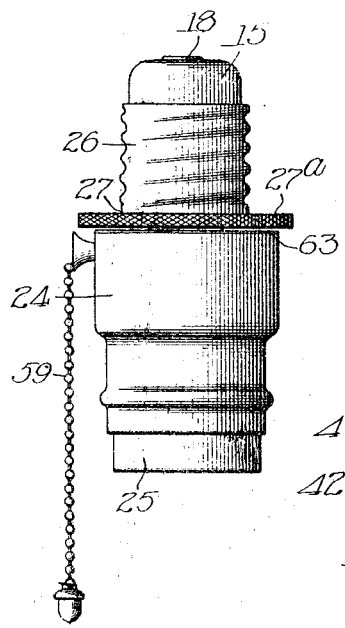
Figure 2:
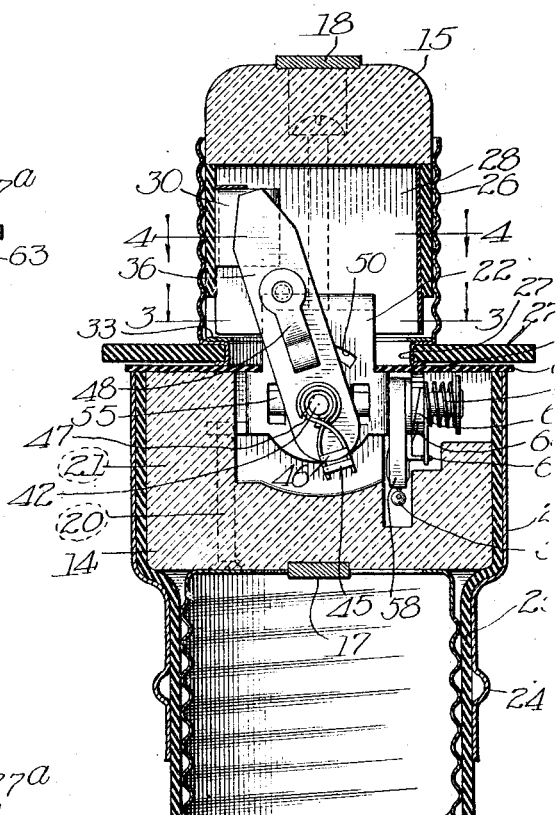
Figure 3:
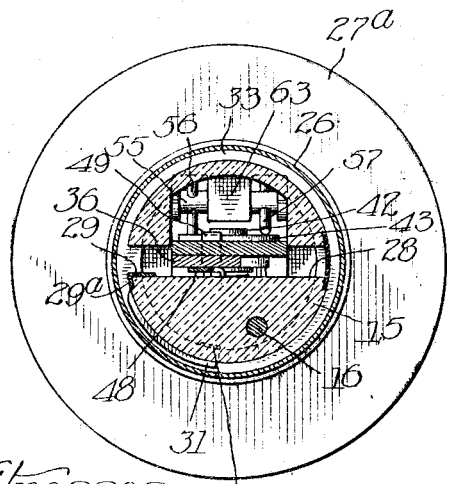
Figure 4:
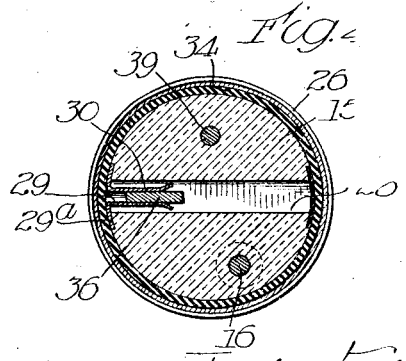

Figure 1 is a side elevation of my improved socket; Fig. 2 is a longitudinal section thereof; Fig. 3 is a transverse section taken on the line 3—3 of Fig. 2; Fig. 4 is a transverse section taken on the line 4—4 of Fig. 2; Fig. 5 is a longitudinal section taken on the line 5—5 of Fig. 6; Fig. 6 is a transverse section taken on the line 6—6 of Fig. 5; Fig. 7 is a bottom plan view of the socket; Fig. 8 is a detail view of one of the switch contacts; Fig. 9 is a detail view showing the means for holding the lamp-receiving shell rigidly in position; Fig. 10 is a detail section of the plug portion of the receptacle; Fig. 11 is a detail view of the insulating cover for the switch-receiving recess in the plug base; Fig. 12 is a detail view of a portion of the plug; Fig. 13 is a detail view of the switch; and Fig. 14 is a disassociated view of the switch parts.

In the preferred embodiment of my invention, I provide an insulating base 14 to which the other parts of the lamp socket are secured. Extending from the top of the base is an insulating projection or plug 15 which is secured in position by a bolt 16 adapted to extend clear through both sections of the base, the lower end or head being adapted to secure in position on the under side of the base the center contact member 17 and the upper end being adapted to screw into a center contact plate 18 mounted on the top of the base section 15. This contact 18 provides a center contact which is adapted to make engagement with the center contact of the lamp receptacle into which the plug is adapted to be inserted. In addition to the center contact 17, a lamp-receiving shell 19 is also secured on the underside of the base by a bolt 20 which is adapted to extend through a portion of the bottom of the lamp-receiving shell through the insulating base and be screwed into a laterally extending lug 21 formed on the switch frame 22. At a point diametrically opposite the bolt 20, the bottom of the threaded shell 19 is provided with an upturned lip 23 which fits in a recess formed on the under side of the base 14 and prevents the threaded shell from becoming twisted or displaced. The base 14 and threaded shell are suitably inclosed in a metallic casing 24 having a suitable insulating lining 25.

Surrounding the plug projection 15 is a rotatable threaded metallic shell 26 which constitutes the outer contact member of the plug and is arranged to be screwed into the lamp socket to which the attachment is to be connected. The lower end of the threaded shell is beaded over, as at 27, to receive an insulating collar 27ª, the outer periphery of which extends beyond the casing 24, and provides means whereby the threaded shell 26 may be rotated by the fingers. Arranged in a suitable slot 28 extending transversely of the plug section 15 is a relatively stationary switch contact member. This member comprises a vertically extending portion 29 from which extends a pair of spring contact jaws 30 between which the movable member of the switch is adapted to engage and a transversely extending annular projection 31. The projection 31 extends around and closely hugs the lower portion of the base projection 15 and is provided with a downwardly extending portion 32. Surrounding the lower portion of the base projection is a metallic ring 33 which makes engagement with the portions 31 and 32 and also makes sliding engagement with the beaded portion of the threaded shell 26, whereby the contact jaws 30 are connected electrically with the rotatable threaded shell 26. Surrounding the base projection 15 at the point where the portion 29ª of the switch contact is located in the recess 28 is an insulating sleeve 34 which serves to hold the contact member in position.

The lower portion of the base projection 15 and the upper portion of the base 14 are recessed as at 35, and arranged in this recess are the operating parts of the movable switch member 36 which is adapted to operate in the recess 28 and make and break contact with the contact jaws 30. The operating parts of the movable switch member are all mounted on the switch frame 22 which comprises a plate 37, the upper end of which has an inturned lug 38 into which screws the bolt 39 adapted to pass through the upper section 15 and aid in maintaining the plate 37 in position. Side ears 40 and 41 are also provided on the plate for a purpose hereinafter more fully described, and extending laterally from the side ear 41 is the lug 21 with which the bolt 20 makes screw-threaded engagement. These two bolts, namely, the bolt 39 and the bolt 20, maintain the plate 37 rigidly in position. Extending through the plate 37 is a stud 42 to which, on one side of the plate, is pivoted the movable contact 36 of the switch and on the other side of the plate is pivoted an oscillating member 43 for operating the switch member 36. The oscillating member 43 is provided with a projection 45 which extends on the underside of the plate 37 and lies parallel to an angular projection 46 on the movable switch member 36. Surrounding the stud 42 is a coiled spring 47, the ends of which are spaced apart by the projections 45 and 46, whereby the two projections are connected together by the coiled spring, and when the oscillating member 43 moves in one direction, through the connection of the coil spring, the movable switch member will also be oscillated in the same direction. On the rear side of the oscillating switch member is a spring 48, the end 49 of which is bent at an angle and projects through a slot in the oscillating switch member 36 and also through a slot 50 in the plate 37. Centrally located in this slot is a projection 51 against which the end 49 of the spring engages. The oscillating member 43 is provided with a cam face 52 which is adapted also to engage the projection 49 and lift the same under proper conditions out of engagement with the projection 51. A pair of shoulders 53 and 54 are provided on the oscillating member, which are engaged by the means operated by the pull member of the switch for the oscillating member. This operating means comprises a rotating shaft 55 having transversely extending projections or pins 56 and 57 extending therethrough, these pins being disposed relatively to one another, so that when one pin is in engagement with one of the shoulders 53 or 54, the other pin has made a half turn. The outer end of the shaft has rotatably mounted thereon a pull lever 58, made of insulating material, to which is connected the pull chain 59 for the switch, which chain is adapted to extend through the casing whereby it may be operated from the exterior. The lever has a transversely extending projection 60, (Fig. 5) adapted to make engagement with the teeth of a ratchet 61 rigidly connected on the shaft 55 and the lever is adapted to be moved back to normal position after the chain has been released by a coiled spring 62, one end of which is adapted to bear against the under side of an insulating cover plate 63, the other end of which is adapted to engage a second projection 60$^a$. The cover plate 63 is adapted to close the recess 35 in the base 14 and is provided with an opening merely large enough to accommodate those parts which project beyond the surface of the plate. Secured to the under side of this cover plate is a spring finger 65 which engages the ratchet teeth 61 to prevent the ratchet from operating in a reverse direction.

In operation, the rotating sleeve is screwed into an ordinary lamp socket, the center contact 18 being adapted to make engagement with the center contact of the lamp socket, and the rotating threaded shell 26 being adapted to make engagement with the threaded shell of the socket. Due to the connection between the center contact 18 and center contact 17, the center contact 17 is electrically connected with the center contact of the lamp socket, and it will be noted that the threaded shell 19 is electrically connected with the switch member 36 by means of the bolt 21 and the frame 22, and as the rotating threaded shell 36 is, as hereinbefore described, electrically connected with the switch jaws 30, when the oscillating switch member is in engagement with the jaws, the threaded shell 19 is electrically connected with the rotating sleeve 26, which in turn, is connected with the outer contact of the lamp socket. When it is desired to close this switch 22, assuming that the same is in the open position, the pull chain 59 is pulled upon. This operates the lever 58 which in turn, through the ratchet wheel 61, rotates the shaft 55. The rotation of the shaft 55 causes, say, the pin 57, to engage the shoulder 53 on the oscillating member and throw the lower end of the same to the left, referring particularly to Figs. 13 and 14. This places the spring 47 under tension, but the oscillating switch member 37 will not move due to the engagement of the end 49 with the projection 51. As the oscillating member is moved, however, the cam surface 52 engages the end 49, raising the end out of engagement with the shoulder, and the oscillating switch member 36 will be permitted to snap over under the influence of the spring 47 and move into engagement with the contact 30, thereby closing the lamp circuit. When the pull chain is released by the operator, the coiled spring 62 throws the lever 58 back into a position to again rotate the shaft 55 which will cause the opposite pin 56 to engage the shoulder 54 and thereby oscillate the oscillating member and with it, as above described, the switch member 36.

Having thus described my invention, what I claim as new and desire to secure by Letters Patent, is:—

1. The combination with a lamp-receiving device, of a plug associated therewith and having a center contact and side contacts, an oscillating switch for connecting one of the contacts of said plug with one of the contacts of the lamp-receiving device, and a flexible pull member for operating said switch.

2. The combination with a lamp-receiving device, of a plug associated therewith having a center contact, a rotatable outer contact carried by said plug, a switch contact having a portion arranged to be slidably engaged by said outer contact, and a switch arm for connecting said switch contact with one of the contacts of the lamp-receiving device.

3. In a device of the character described, the combination with an insulating base, of a threaded shell and center contact mounted on one side of said base, an insulating projection on the other side of said base, a center contact mounted on said projection and a rotatable threaded contact mounted on said projection, a stationary switch contact arranged in a recess in said projection and having a sliding electrical connection with said rotatable sleeve, an oscillating switch contact mounted in a recess in said insulating base, and a flexible pull member extending to the exterior of the socket casing for operating said oscillating switch contact.

4. In a device of the character described, the combination with an insulating base, of a center contact and threaded lamp-receiving shell mounted on one side thereof, an insulating projection from said base on the other side thereof, a center contact mounted on the end of said projection, a rotatable threaded sleeve surrounding said projection, a stationary switch contact mounted in a recess in said projection and having a sliding electrical connection with said rotatable sleeve, an oscillating switch contact operating in said recess and mounted on a frame arranged in a recess in said base and having electrical connection with said threaded shell, an oscillating member, a spring connecting said oscillating member with the oscillating switch contact, a flexible pull member extending to the exterior of the socket casing for operating said oscillating member, and means for holding the oscillating switch member against movement until the spring has been placed under sufficient tension to operate the same.

5. In a device of the character described, the combination with an insulating base, of a threaded lamp receiver, a lamp-receiving shell and center contact mounted on one side thereof, an insulating projection extending beyond the opposite side thereof, a center contact and outer contact carried on said projection, a stationary switch contact connected with one of the contacts on said projection, an oscillating switch contact, an oscillating member for operating the same, a spring connecting said oscillating contact and said oscillating member, a rotatable member for operating said oscillating member, and a flexible pull member for operating said rotatable member.

In witness whereof, I have hereunto subscribed my name in the presence of two witnesses.

ERNST G. K. ANDERSON.

Witnesses:
CHARLES G. COPE,
C. L. HOPKINS.